United States Patent [19]

Shepherd

[11] Patent Number: 5,033,333
[45] Date of Patent: Jul. 23, 1991

[54] SAW CHAIN GRINDING MACHINE

[76] Inventor: James E. Shepherd, 1231 Dutton Rd., Eagle Point, Oreg. 97524

[21] Appl. No.: 476,723

[22] Filed: Feb. 8, 1990

[51] Int. Cl.[5] .............................................. B23D 63/16
[52] U.S. Cl. ......................................... 76/37; 76/80.5
[58] Field of Search .................... 76/37, 40, 78.1, 80.5

[56] References Cited

U.S. PATENT DOCUMENTS 3,779,103 12/1973 Silvey .
4,287,793 9/1981 Silvey .
4,836,058 6/1989 Shepherd .

FOREIGN PATENT DOCUMENTS 173848 1/1953 Fed. Rep. of Germany ....... 76/78.1

Primary Examiner—Roscoe V. Parker
Attorney, Agent, or Firm—Eugene M. Eckelman

[57] ABSTRACT

A disc-shaped grinding wheel has a peripheral grinding edge, and according to one feature of the invention a centered grinding point is used on the grinding wheel for precise and symmetrical sharpening of right and left cutter elements of a saw chain. The chain is supported by a chain holding bar which in turn is supported on a pivot support on the base of the machine. The pivot support provides adjustment of the bar for oblique engagement of the grinding wheel with the cutter elements. The pivot support also provides a tilting adjustment of the chain holding bar for engagement of the grinding wheel with the cutter elements at a secondary angle whereby to sharpen chisel bit chains. The pivot support also allows the machine to sharpen chipper tooth chains.

10 Claims, 6 Drawing Sheets

SAW CHAIN GRINDING MACHINE

BACKGROUND OF THE INVENTION

This invention relates to a saw chain grinding machine.

As is well known, saw chains in popular use have right and left cutter elements on alternate cutter links. Two common types of chains are the "chipper" or "round tooth" chain and the "chisel bit" chain. The cutter elements of the chipper chain have a somewhat simplified shape comprising a curved, hooked-shaped edge. In sharpening this chipper chain, a properly shaped grinding wheel is inclined downwardly and obliquely relative to the cutter element with the grinding wheel being laterally parallel with the cutter element. The cutter elements of the chisel bit chain have generally L-shaped surfaces with angles meeting at a sharp corner. This latter type of cutter element is more complicated in its grind since the surfaces thereof meet at precise and predetermined angles. In sharpening this latter chain, the grinding wheel is also inclined downwardly into the cutter element and the engagement is also from the front at an oblique angle. However, in order to achieve the proper grind on the angular edges, the cutter element must have a tilted relation to the grinding wheel.

Structure to achieve a highly efficient grinding of the chisel bit chain is shown in my U.S. Pat. No. 4,836,058. In this structure, a pivotal support of the chain holder is provided whereby the cutter element being sharpened is held on the pivotal axis of the holder, namely, the pivotal axis of the chain holder passes through the area of the grinding engagement and all the cutter elements, right and left, use the same radial grinding point on the edge of the grinding wheel. To accomplish this feature, the support of the chain holder is parallel with the plane of the grinding wheel and the support of the chain on the holder is at an angular plane relative to the grinding wheel, whereby the proper grind of both right and left cutter elements is accomplished by pivoting the holder between identical opposite angular positions.

SUMMARY OF THE INVENTION

According to the present invention and forming a primary objective thereof, a saw chain grinding machine is provided that also uses the same radial grinding point on the edge of the grinding wheel for grinding right and left cutter elements but accomplishes uniform grinding of right and left cutter elements in a different manner.

A further object is to provide a saw chain grinder that can conveniently be used to grind either a chipper or chisel bit type cutter element.

In carrying out these objectives, the grinding machine includes a disc-shaped grinding wheel having a peripheral grinding edge. As one feature of the invention, a centered grinding point is used on the grinding wheel for precise and symmetrical sharpening of right and left cutter elements. The chain is supported by saw chain holder means in turn supported on pivot support means that provide oblique grinding of the cutter elements. The pivot support means also include means for tilting the saw chain holder means selectively for presenting said cutter elements of a chisel bit chain to the grinding wheel at a secondary angle. The pivot support means also provides for the sharpening of chipper tooth chains.

The invention will be better understood and additional objects and advantages will become apparent from the following description taken in connection with the accompanying drawings.

DETAILED DESCRIPTION OF A PREFERRED EMBODIMENT

Figure 7:
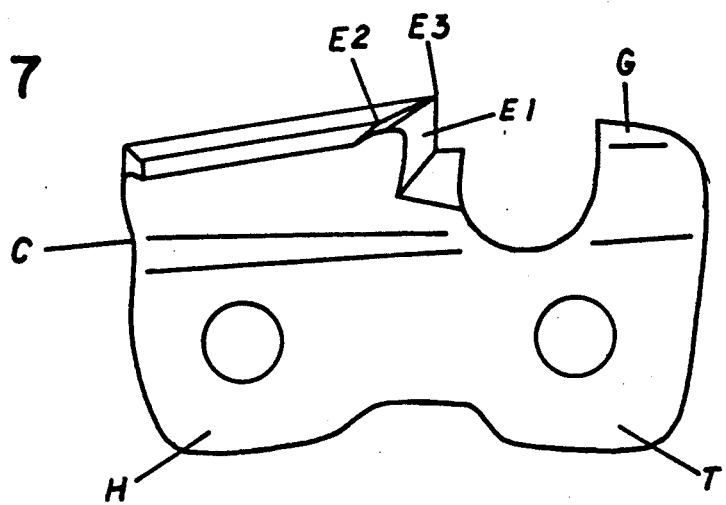
FIG. 7 is an enlarged side elevational view of a chisel bit cutter element.

With particular reference to the drawings, and first to FIG. 7, a representative chisel bit cutter element C is shown. It has the usual heel H and toe T, respectively, a depth gauge G, a chisel-shaped edge E1, an undercut edge E2 which leads rearwardly from edge E1 and selectively angled. Edges E1 and E2 meet in a working corner E3.

The present invention was particularly designed for sharpening chisel bit cutter elements as shown in FIG. 7 but as will be more apparent hereinafter, the present invention can also conveniently sharpen cutter elements of chipper tooth chains.

The basic machine with which the present invention can be used comprises a machine base 10 that supports a grinding wheel 12 shielded by a guard 14. The grinding wheel is driven by a motor 16, and the motor and wheel assembly is secured to slide means 20. Slide means 20 is supported on an elongated body member 22 and is adjustable longitudinally of such body member by an adjusting screw 24 threadedly mounted in the end of the slide means and abutting the end of the body member 22. Screw 24 adjustably moves the motor assembly and grinding wheel to selected positions as the wheel wears. Body member 22 is supported on an upright pivot 26 of an upright extension 2B integral with a lateral bed plate 30 in turn integral with the machine base 10. The motor and grinding wheel assembly is held retracted on its pivot 26, namely, in a counterclockwise direction as viewed in FIG. 1 by a tension spring 32 connected between the slide means 20 and the bedplate. The spring also holds the screw 24 in abutment with the end of body member 22. A factory installed stop screw 34 is mounted adjustably in the body member 22 and is arranged for abutment with the upright extension 2B. This screw locates the leading edge of the grinding wheel selectively at the completion of a grinding step. Adjusted pivot support of extension 2B on bed plate 30 is by means of a locking pivot assembly 56 secured between extension 28 and a upright flange 30a integral with bed plate 30.

Bed plate 30 forms a base for a head 42 mounted on a pivot 45 and having an upwardly projecting integral platelike extension 44 with an arcuate slot 46 adjacent its upper end. Symmetrical degree markings 50 are provided on each side of center of the slot. The upper edge of extension 44 has a concaved cutaway portion 48 centrally thereof. Upright posts 52 are supported on the extension 44 by means of projections 55 at the lower ends thereof slidably fitted in slot 46. Projections 53 have clamp nuts 54 on the opposite side of extensions 44 from posts 52 whereby to selectively secure the projections in the slot. A chain holder 56 is secured between the posts crosswise of the extension 44 in the area of the cutaway portion 48. The double post arrangement maintains them on the radius of the slot in all adjustments in the slot. Chain holder 56 has an edge slot 58 extending across the top and down the ends whereby the drive tines of a saw chain, not shown in FIG. 7, are arranged to be guided therein and arranged, as illustrated by a single tooth in FIGS. 5 and 6, to be engaged by the grinding wheel 12.

The grinder employs a stop pawl 60 arranged to engage the rear edge of a cutter element and hold the cutter element stationary at a grinding point a comprising the position of a grinding edge of the wheel after it has been moved fully through a grinding operation. This stop pawl is pivotally supported on an upright link 62 and is associated with an upright post 64 and adjusting screw 66 in a conventional manner for adjusting and holding the cutter element in a selected grinding position.

Figure 4:
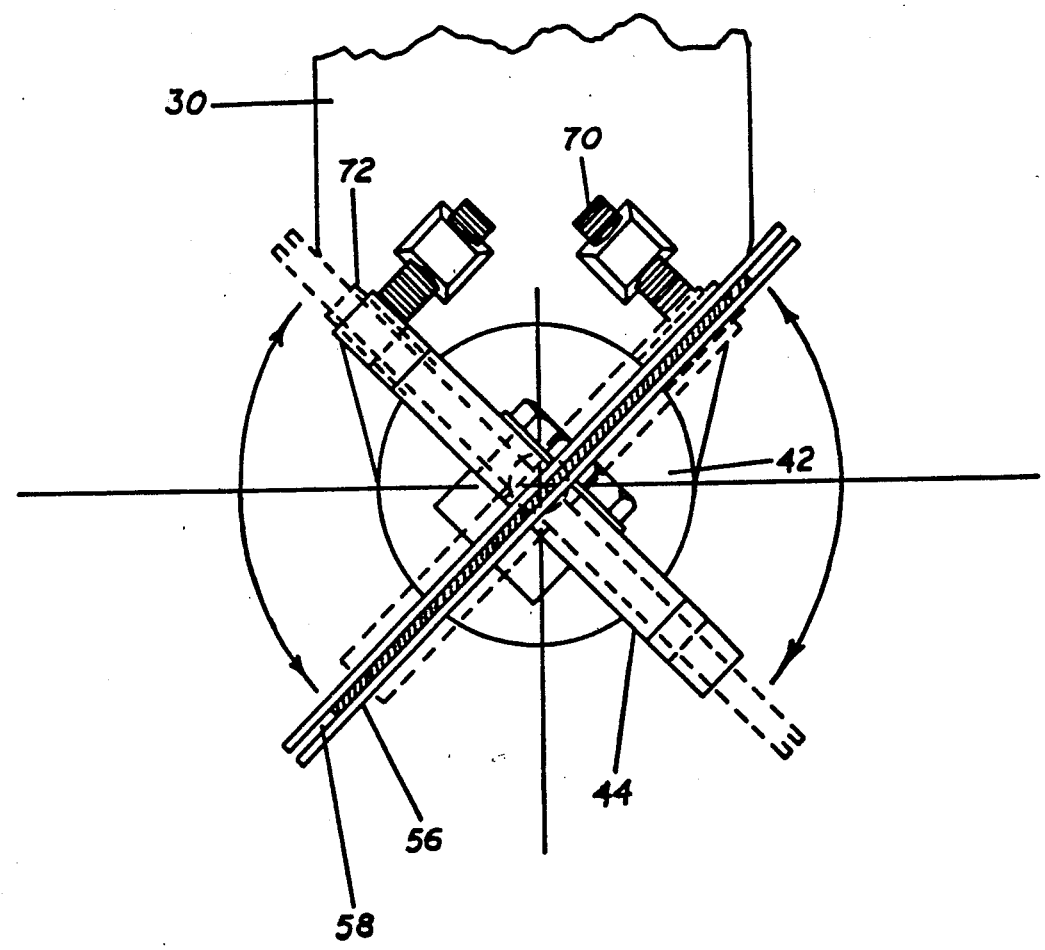
FIG. 4 is an enlarged sectional view taken on the line 4—4 of FIG. 2 and showing in particular stop means for the chain holding means.

With reference to FIG. 4, the bed plate 30 has adjustable stop screws 70 positioned for engagement by pinlike extensions 72 on the head 42 in limits of movement for selected angular engagement of the grinding wheel into cutter elements, as will be more apparent hereinafter.

Figure 1:
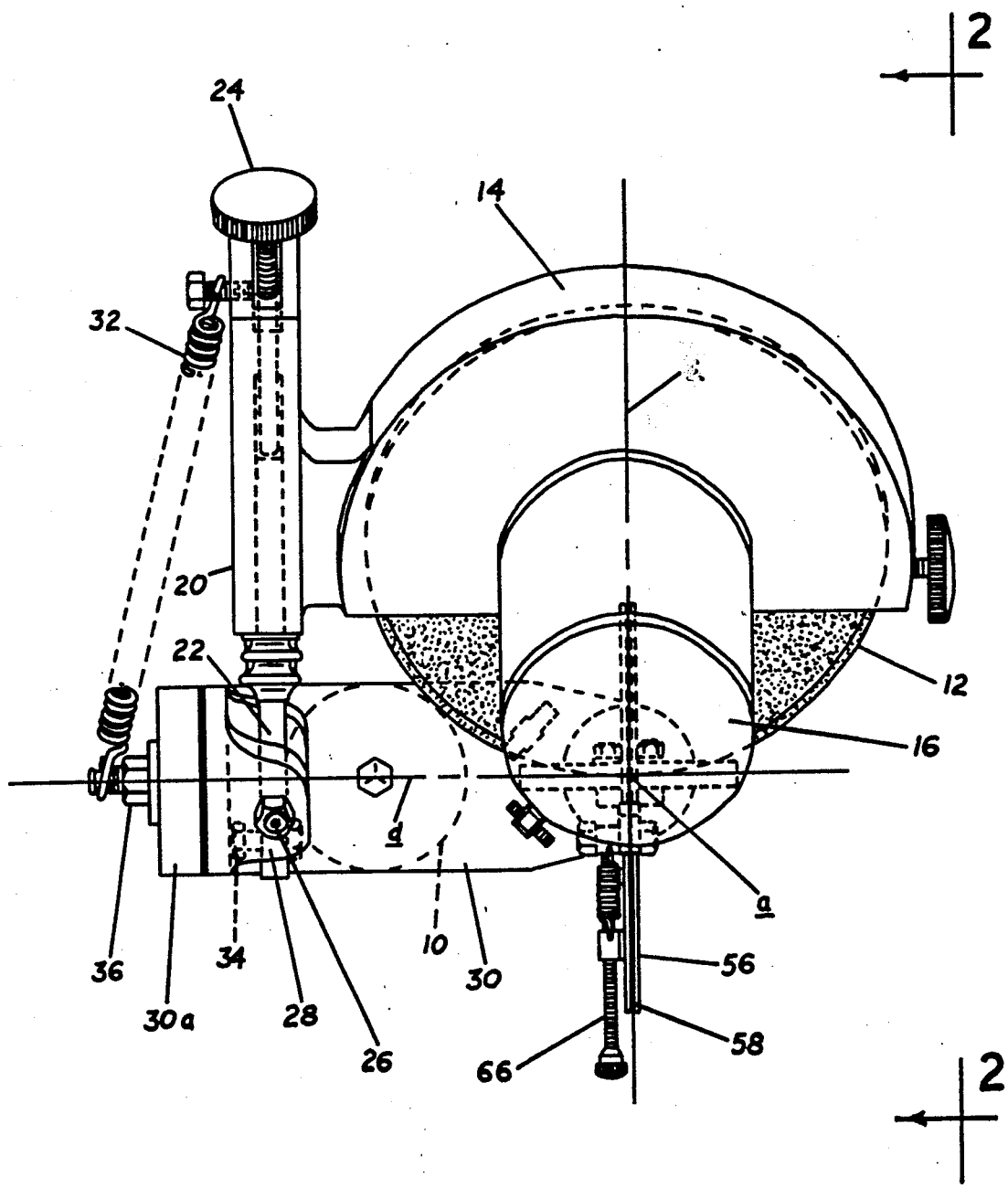
FIG. 1 is a top plan view of a saw chain grinding machine embodying features of the present invention.
Figure 2:
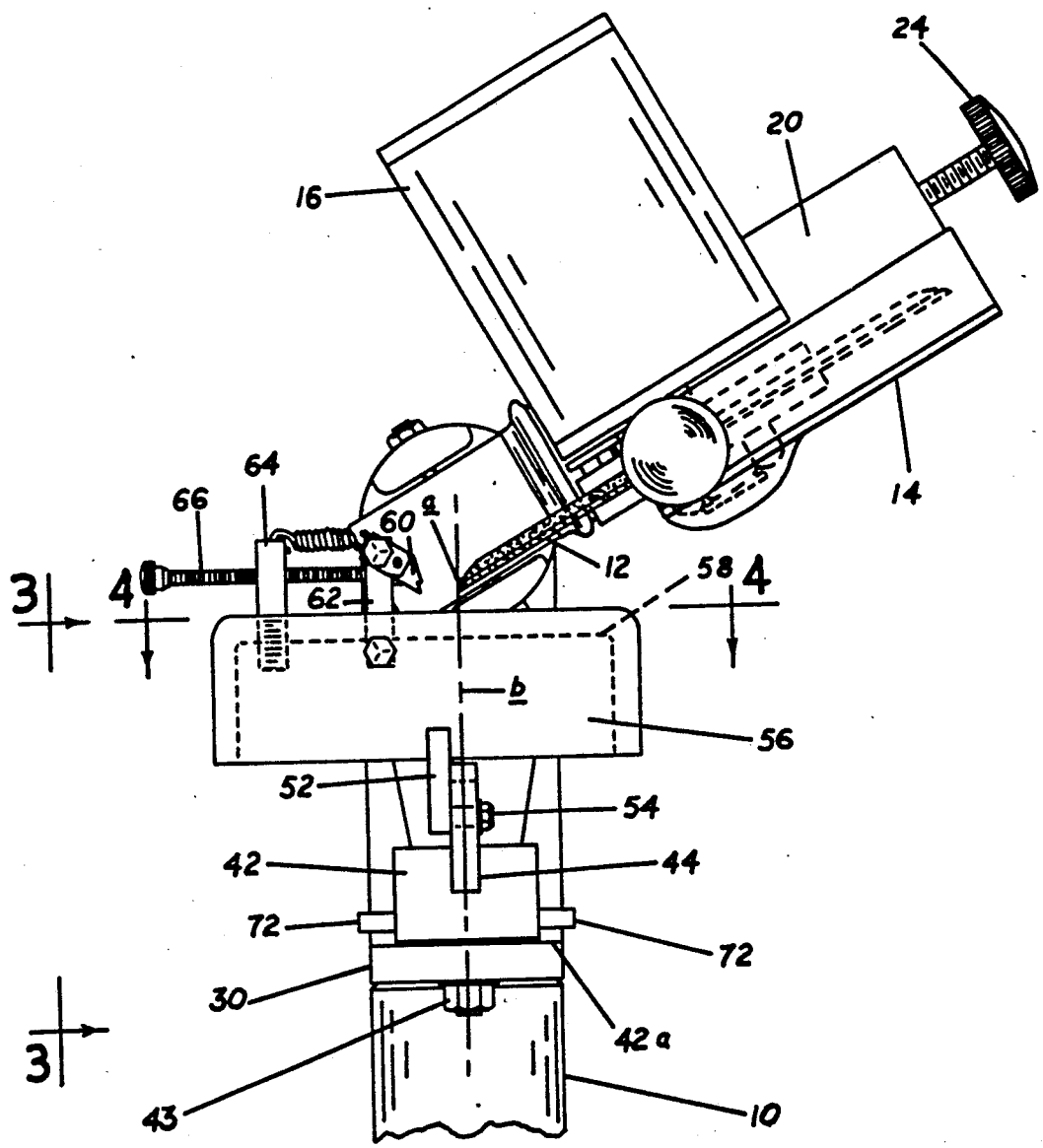
FIG. 2 is a side elevational view of the machine, taken on the line 2—2 of FIG. 1.
Figure 3:
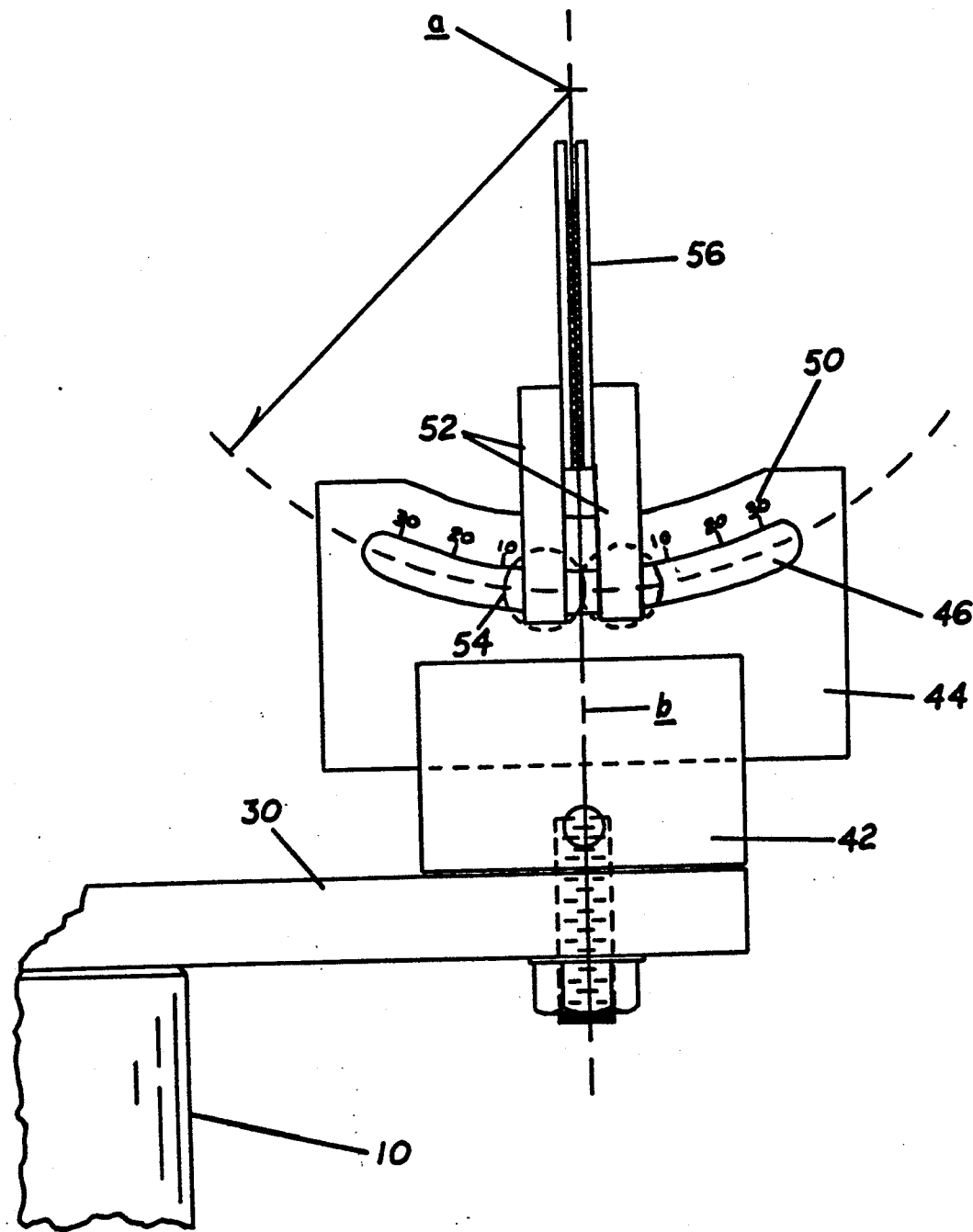
FIG. 3 is an enlarged fragmentary front elevational view taken on the line 3—3 of FIG. 2.

According to the present invention, the angle of support of the grinding wheel 12 is of a selected value such as 30 degrees, relative to the supporting surface 42a for the head 42. Also according to the invention, the axis b of the pivot 45 passes centrally through extension 44 and precisely through the grinding point a whereby in a centered position of the chain holder 56 as shown in FIG. 1, the edge slot 58 is aligned with the grinding point a. The grinding position of both right and left cutter elements will be centrally of the grinding wheel, namely, at point a, and for the purpose of maintaining the grinding wheel on line c in linear alignment with slot 5B in a centered position of the chain holder, the line c and slide means 20 are parallel and disposed at right angles to an imaginary line d intersecting axis b.

Also according to the invention, the center of radius of adjustment of chain holder 56 in the slot 46 is at the grinding point a whereby regardless of the centered or side to side adjustment of the clamp bolts 54 in the slot 46 to vary the lateral tilt of the chain holder 56, the portion of the outer element to be ground, as selectively positioned by the stop pawl 60, will always be maintained at the grinding point. By adjusting the clamp bolt in the slot 86 to one side or the other, the holder tilts with the bottom thereof moving toward the wheel.

OPERATION

In the operation of the present chain grinder, it is assumed that stop screw 34 will have been properly positioned at the factory to stop the wheel at the completion of a grinding step precisely with its leading or grinding edge at point a and that the wheel is at a selected angle from the supporting surface 42a. The chain is mounted in the slot 58 of the holder 56 and the adjusting screw 62 for the stop pawl 60 positioned such that when the cutter elements are fully ground, they are provided precisely with the chisel bit sharp corner between side and top ground edges. Also before grinding, stop screws 70 are adjusted so as to control the angle, 45 degrees for example, in which the wheel will obliquely engage the cutter elements. Furthermore, if there has been wheel wear, the operator moves the wheel forward by adjustment of screw 24 such that the grinding point a thereof at the completion of a grinding step is on the axis b.

Figure 5:
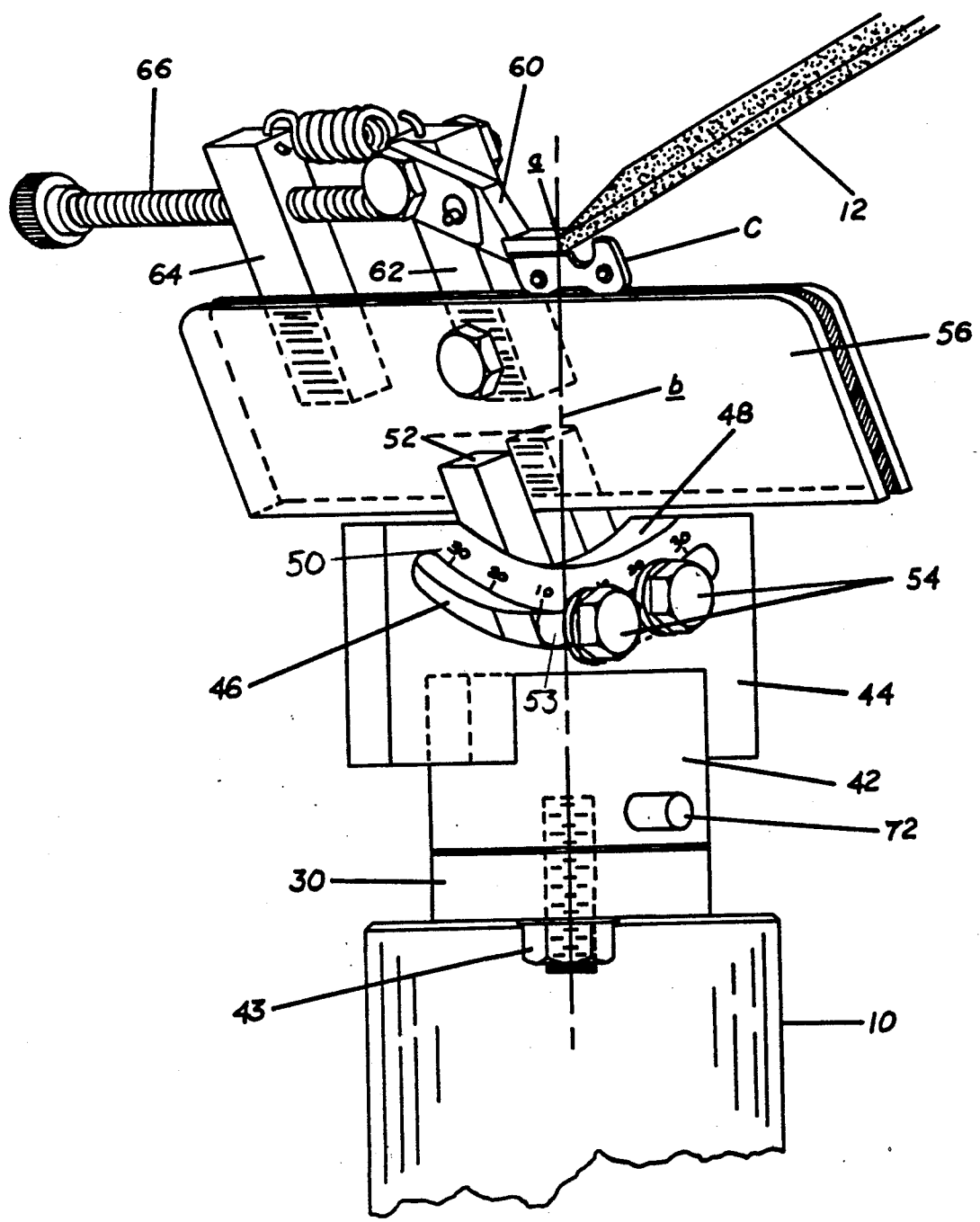
FIG. 5 is a perspective view of the present saw chain grinding machine operating on a right cutter element of a chisel bit chain.
Figure 6:
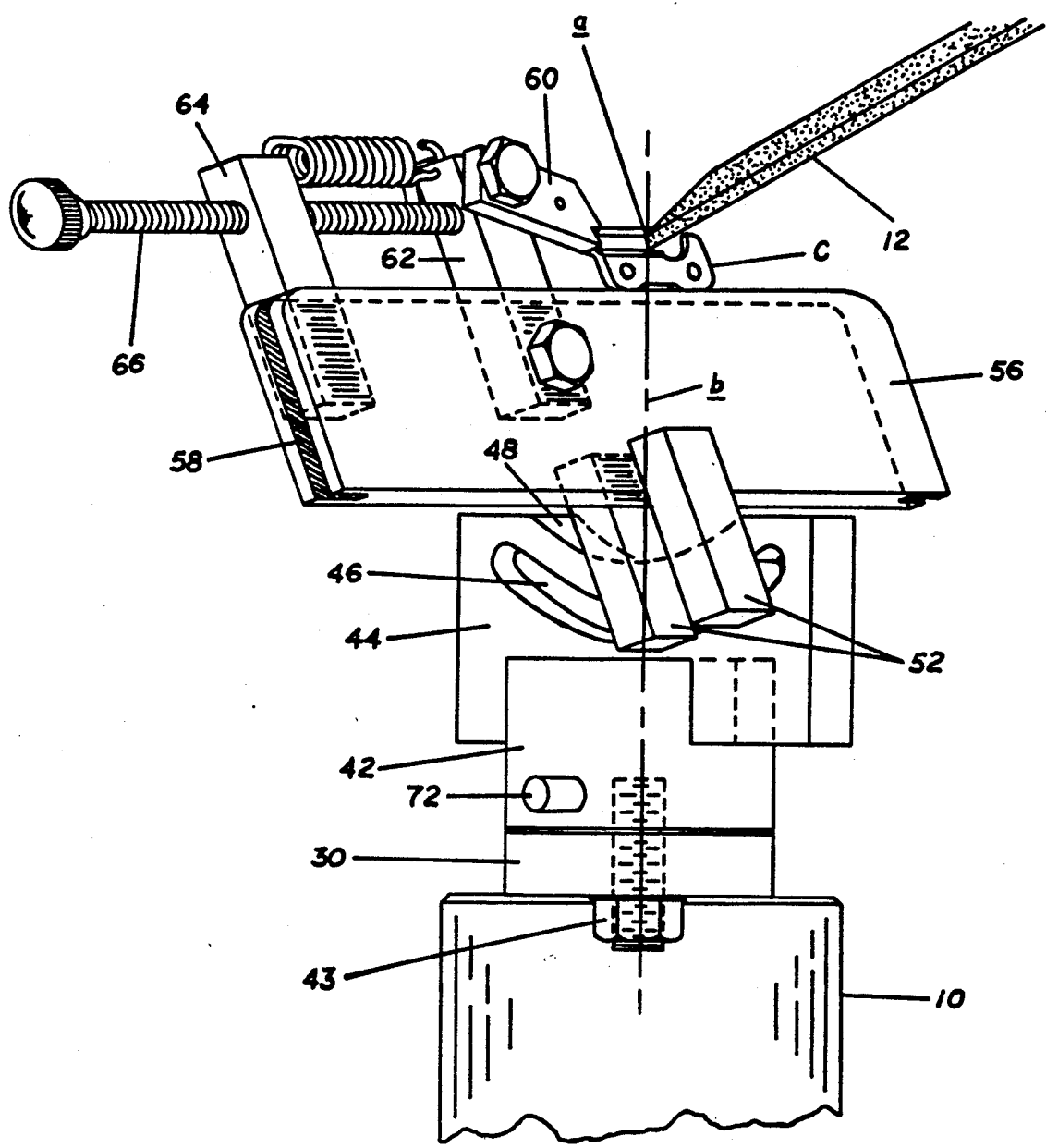
FIG. 6 is a perspective view similar to FIG. 5 but showing operation of the machine on a left cutter element of a chisel bit chain.

In order to obtain the proper angle of the undercut surface E2 of the cutter element, adjustment of the clamp bolts 54 in the arcuate slot is made. As an example, with the grinding wheel 12 disposed at an angle of 30 degrees relative to supporting surface 42a, the clamp bolts 54 are moved over approximately 20 degrees. These angles may vary. As the angle between the grinding wheel 12 and the supporting surface 42a is increased, the farther the clamp bolts 54 must be advanced away from center. Since the center of the radius of movement of the chain holder 56 is on the grinding point a, advancing the clamp bolts in the slot will merely tilt the cutter element laterally at the bottom toward the grinding wheel, the top edge of the chain holder remaining steady adjacent the grinding point. FIG. 5 illustrates the position of the chain holder 54 for grinding a right cutter element, and FIG. 6 illustrates the position of the holder for grinding a left cutter element. In the usual operation, the parts will be positioned at their 45 degree angle against a stop 70 and with their proper tilt of fastening by clamp bolts 54. All the cutter elements on the one side, such as the right side, will then be ground. Thereupon, rotation to the other stop 70 and movement of the clamp bolts 54 to the opposite identical degree setting will be accomplished for grinding the left cutter elements.

Since the grinding functions are all accomplished centrally of the grinding wheel, symmetrical grinding of both right and left cutter elements is accomplished. Such makes for the best possible cutting operation of the chain. Also, the chain does not have to be relocated on a holder or moved from one side of the wheel to the other.

The present invention is also designed to grind chipper chains wherein the grinding wheel has a round grinding edge. In such use of the present apparatus, the round edge grinding wheel is angled selectively, such as 30 degrees, from the supporting surface 42a and the stop 70 positioned to provide pivoted positioning of the head 42 to approximately 30 degrees. The clamp bolts 54 are locked in a centered or upright position for grinding both right and left cutter elements and grinding is accomplished by the oblique grinding relationship between the grinding wheel and the upright cutter elements.

Here again, grinding is accomplished at a centered and common point on the grinding wheel whereby to accomplish precise and symmetrical sharpening.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A grinding machine for saw chains having alternate right and left cutter elements, said grinding machine comprising a machine base, a disc-shaped rotatable grinding wheel having a peripheral grinding edge and a centered grinding point, a saw chain holder having longitudinal support means for holding a saw chain with the cutter elements adjacent the grinding edge of said wheel, pivot support means for supporting said saw chain holder and providing an oblique grinding angle of said grinding wheel with a cutter element on said saw chain holder, and means for tilting said saw chain holder selectively laterally for presenting said cutter element to said grinding wheel at a secondary angle.

2. The grinding machine of claim 1 wherein said means for tilting said saw chain holder comprises an upright support having pivot support on said pivot support means, said upright support having a radial center of adjustment on the centered grinding point of said grinding wheel.

3. The grinding machine of claim 1 wherein said means for tilting said saw chain holder comprises an upright extension on said pivot support means, an arcuate slot in said extension having a radial center on the centered grinding point of said grinding wheel, and means having mounted connection in said slot for connecting said saw chain holder means with said extension and providing tilting adjustment of said saw chain holder means.

4. The grinding machine of claim 1 wherein said means for tilting said saw chain holder comprises an upright extension on said pivot support means, an arcuate slot in extension having a center portion and outwardly extending portions, the radial center of said arcuate slot being on the centered grinding point of said grinding wheel, and means having mounted connection in said slot for connecting said saw chain holder with said extension and providing tilting adjustment of said saw chain holder.

5. The grinding machine of claim 4 including degree markings along said slot for preselected settings of said means that have mounted connection in said slot.

6. The grinding machine of claim 4 including symmetrical degree markings on each side of the center of said slot for preselected settings of said center for said means that have mounted connection in said slot whereby to symmetrically grind right and left cutter elements.

7. A grinding machine for saw chains having alternate right and left cutter elements each with at least two relatively angled cutting edges, said grinding machine comprising a machine base, a disc-shaped rotatable grinding wheel having a peripheral grinding edge and a centered grinding point, a saw chain holder having longitudinal support means for holding a saw chain with the cutter elements adjacent the centered grinding point of said wheel, adjustable support means connected between said base and said saw chain holder arranged to move the latter to a pair of planes relative to said grinding wheel for one-step grinding of a cutter element, the first of said planes comprising a pivoted position relative to said grinding wheel and the second of said planes comprising a laterally tilted position relative to said grinding wheel.

8. The grinding machine of claim 7, wherein said adjustable support means comprises an upright extension, an arcuate slot in said extension having a radial center on the centered grinding point of said grinding wheel, and means having mounted connection in said slot for connecting said saw chain holder with said extension and providing said tilted positioning of said saw chain holder.

9. The grinding machine of claim 8 including degree markings along said slot for preselected settings of said means that have mounted connection in said slot.

10. A grinding machine for saw chains having alternate right and left cutter elements each with at least two relatively angled cutting edges, said grinding machine comprising a machine base, a disc-shaped rotatable grinding wheel having a peripheral grinding edge and a centered grinding point, a saw chain holder having longitudinal support means for holding a saw chain with the cutter elements adjacent the centered grinding point of said wheel, adjustable support means on said base arranged to move said saw chain holder and said grinding wheel to a pair of relative planes for one-step grinding of a cutter element, the first of said planes comprising a relative pivoted position between said saw chain holder and the grinding wheel and the second of said planes comprising a laterally tilted position of said saw chain holder and relative to said grinding wheel.

* * * * *